United States Patent [19]
Collins et al.

[11] 4,333,080
[45] Jun. 1, 1982

[54] SIGNAL PROCESSOR

[75] Inventors: John D. Collins, Burlington; Douglas S. MacFall, Jr., Winchester; William A. Sciarretta, Lexington, all of Mass.

[73] Assignee: Raytheon Company, Lexington, Mass.

[21] Appl. No.: 816,422

[22] Filed: Jul. 18, 1977

[51] Int. Cl.³ .......................................... G01S 13/28
[52] U.S. Cl. .......................... 343/17.2 PC; 343/5 NQ
[58] Field of Search ................................ 343/17.2 PC

[56] References Cited
U.S. PATENT DOCUMENTS

| | | | |
|---|---|---|---|
| 3,905,033 | 9/1975 | Moore et al. | 343/17.2 PC X |
| 4,005,417 | 1/1977 | Collins | 343/17.2 PC X |
| 4,021,805 | 5/1977 | Effinger et al. | 343/17.2 PC |
| 4,028,700 | 6/1977 | Carey et al. | 343/17.2 PC |
| 4,037,159 | 7/1977 | Martin | 343/17.2 PC X |

Primary Examiner—T. H. Tubbesing
Attorney, Agent, or Firm—Richard M. Sharkansky; Joseph D. Pannone

[57] ABSTRACT

A signal processor is disclosed wherein an intermediate frequency chirp pulse is pulse compressed and the linearly frequency modulated, intermediate frequency component of such compressed pulse is removed. With such an arrangement, various weighting techniques may be effectively used to reduce sidelobes of the compressed pulse while, in a radar system application, retaining the sense of the frequency of a Doppler shifted compressed pulse.

12 Claims, 19 Drawing Figures

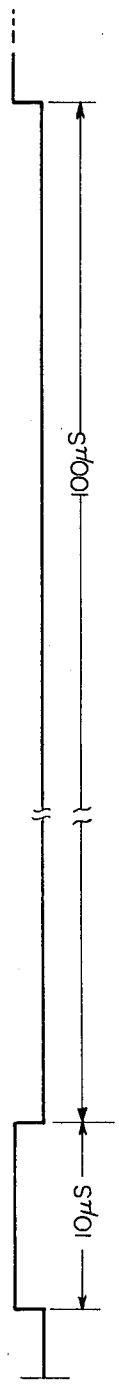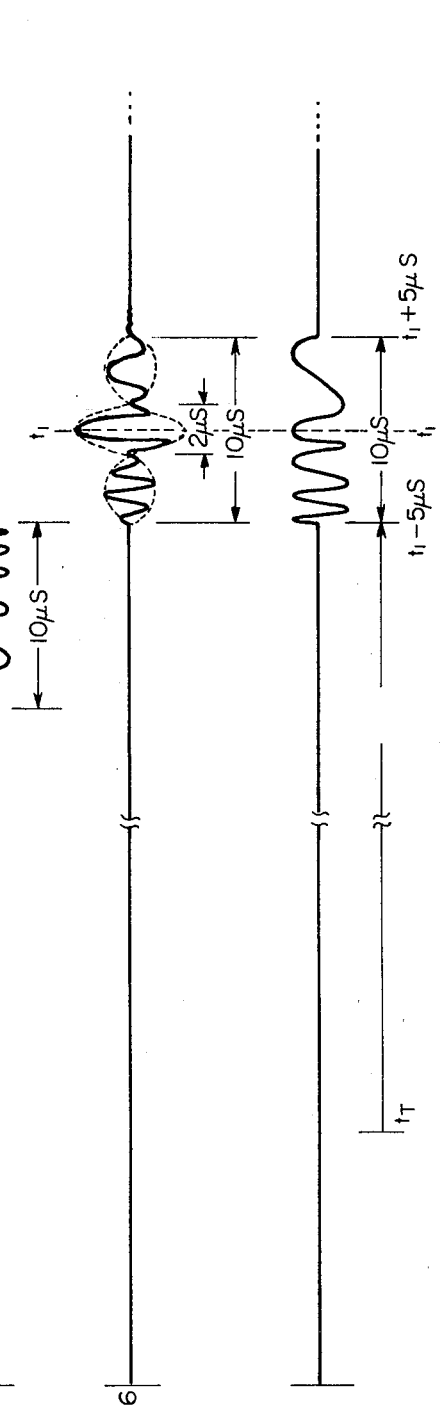
FIG. 2a OUTPUT GATE 24
FIG. 2b OUTPUT OF SAW 26
FIG. 2c OUTPUT OF MODULATOR 18
FIG. 2d OUTPUT OF MIXER 32
FIG. 2e OUTPUT PULSE COMPRESSION SECTION 36
FIG. 2f OUTPUT OF SAW 44

SIGNAL PROCESSOR

BACKGROUND OF THE INVENTION

This invention relates generally to signal processors and more particularly to real time signal processors which are adapted to process chirp or linear frequency modulated pulses.

As is known in the art, chirp or linear frequency modulated pulses are used in a variety of applications including pulse compression radars, as described in U.S. Pat. No. 4,028,700, inventors Carey et al., issued June 7, 1977, and assigned to the same assignee as the present invention, and frequency spectrum analyzers, as described in U.S. Pat. No. 4,005,417, inventor John D. Collins, issued Jan. 25, 1977, and assigned to the same assignee as the present invention. In such applications, the chirp pulse is pulse compressed in a matched filter to provide an indication of a target or the Doppler velocity of a moving target, for example. As is further known, the compressed pulse possesses undesirable sidelobes which can severely limit target or Doppler frequency resolution when the relative magnitudes of signals are large. Various weighting and equilization techniques to reduce such sidelobes are discussed in "Radar Handbook," M. I. Skolnick, Editor-In-Chief, McGraw-Hill Book Company, New York, N.Y. (1970), pages 20-26 to 20-35. Such techniques include various amplitude weighting techniques, such as Hamming weighting, and have been found satisfactory in many applications.

However, in many applications, it is necessary to separate the compressed pulse into "in phase" and "quadrature" components (see, for example, page 20-21 of the above-referenced "Radar Handbook"), as, for example, in radar system applications where the "sense" of the Doppler frequency is necessary, as in determining whether a target is "approaching" or "receeding" (i.e., has a "positive" or "negative" Doppler frequency). Such separation is conveniently performed by passing intermediate frequency compressed pulse signals through a quadrature phase detector to produce a pair of compressed video frequency pulses while preserving the phase of the target return (the rate of change of phase from pulse to pulse being proportional to the Doppler frequency of the target). However, while such technique is generally satisfactory where the chirp pulse has a relatively high time-bandwidth product (i.e., say in the order of 100), in applications where the chirp pulse has a relatively small time-bandwidth product, separation of the intermediate frequency compressed pulse into quadrature channels using such quadrature phase detection technique produces video frequency compressed pulses which retain relatively large sidelobes despite the use of the weighting techniques described above.

SUMMARY OF THE INVENTION

With this background of the invention in mind, it is therefore an object of this invention to provide an improved signal processor adapted for use with chirp pulses having relatively low time-bandwidth products to produce compressed pulses having relatively small sidelobes.

This and other objects of the invention are attained generally by providing, in a signal processor: means for pulse compressing an intermediate frequency chirp pulse to produce a compressed pulse having a linearly frequency modulated, intermediate frequency component; and, means for removing the linearly frequency modulated, intermediate frequency component of such compressed pulse.

With such an arrangement, various weighting techniques may be effectively used to reduce sidelobes of a compressed pulse because the quadratic phase variation, i.e., the linearly frequency modulated intermediate frequency of the compressed pulse, has been removed. Further, the removing means may include a quadrature phase detector for separating the compressed pulse into a pair of video frequency compressed pulses, thereby enabling, in radar system applications for example, the "sense" of the frequency of a Doppler shifted compressed pulse.

BRIEF DESCRIPTION OF THE DRAWINGS

The above-mentioned and other features of the invention will become more apparent by reference to the following description taken together in conjunction with the accompanying drawings in which:

FIGS. 2a-2f are timing diagrams useful in understanding the operation of the radar system of FIG. 1;

DESCRIPTION OF THE PREFERRED EMBODIMENTS

Figure 1:
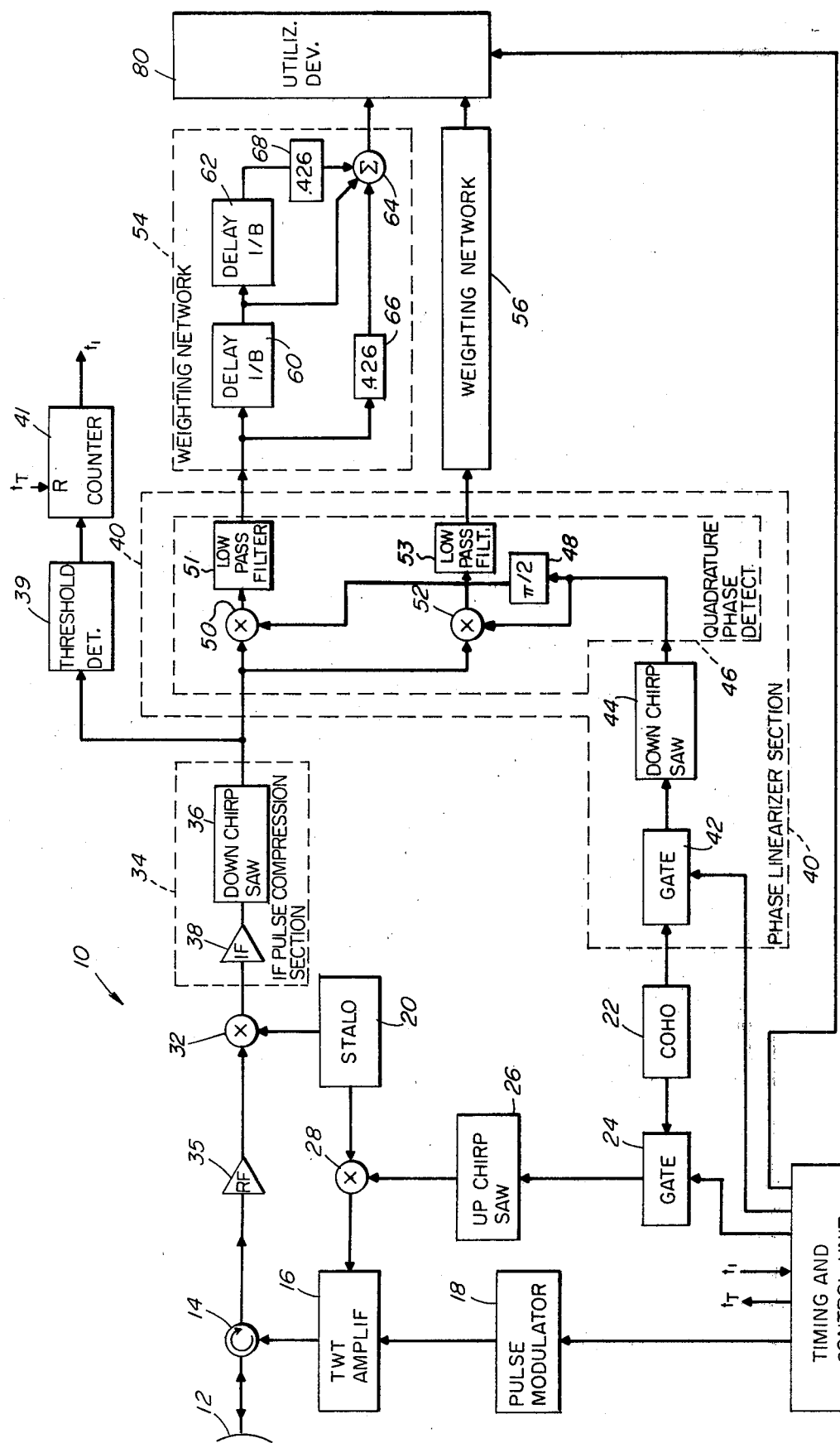
FIG. 1 is a block diagram of a radar system according to the invention.

Referring now to the drawings wherein like reference characters represent like or similar elements throughout the several figures, FIG. 1 shows a coherent pulse Doppler pulse compression radar system 10. Such radar system 10 includes an antenna 12 coupled through a circulator 14 to a traveling wave tube (TWT) amplifier 16 and a pulse modulator 18, as shown. A radio frequency (RF) signal produced by stable local oscillator (STALO) 20 is heterodyned with a linearly frequency modulated pulse produced by coherent local oscillator (COHO) 22, gate 24 and surface acoustic wave (SAW) delay line 26 in a mixer 28 to produce a train of chirp pulses of radio frequency energy after amplification in TWT amplifier 16 in a conventional manner. The COHO 22 produces an intermediate frequency signal, here 60 MHz, which is passed through gate 24 in response to a gating signal from timing and control unit 30. Here such gate 24 is pulsed for 0.5 $\mu$s, and hence a 60 MHz pulse of 0.5 μs duration is passed to SAW delay line 26. The SAW delay line 26 is here of any conventional design and produces a linearly frequency modulated pulse in response to the 0.5 μs, 60 MHz pulse fed thereto from gate 24. Here the SAW delay line 26 produces an "up chirp" pulse (i.e., frequency increases linearly with time) and, in particular, has a dispersive time of 10 μs and a dispersive bandwidth of 1.0 MHz. Therefore, in response to the 0.5 μs, 60 MHz pulse from gate 24, the SAW delay line 26 produces a chirp pulse having a time duration of 10 μs and a frequency which varies linearly over such time duration from 59.5 MHz to 60.5 MHz. That is, the signal produced by SAW delay line 26 is an intermediate frequency chirp pulse, here having a time-bandwidth product of 10. The pulses produced at the output of gate 24 and the intermediate frequency modulated chirp pulse produced at the output of SAW delay line 26 are shown in FIGS. 2a and 2b, respectively.

The intermediate frequency up chirp pulse produced by SAW delay line 26 is fed to mixer 28 along with the RF signal produced by STALO 20. Timing and control unit 30 produces a train of 10 μs pulses (FIG. 2c) for pulse modulator 18 synchronously as a train of 0.5 μs pulses are applied by such timing and control unit 30 to gate 24, here once every 110 μs, i.e., the radar system PRI (pulse repetition interval), to enable a train of radio frequency chirp pulses, here 10 μs in duration, to be amplified in TWT amplifier 16 and transmitted from the radar via antenna 12.

Each one of the RF chirp pulses in the train of transmitted pulses is reflected by various objects (not shown) which are disposed at various ranges from the antenna 12. A portion of the reflected energy produced in response to each transmitted pulse is received by the antenna 12. The time at which a portion of such energy is received relative to the time at which the transmitted pulse associated therewith is transmitted corresponds to the range of the object causing such portion of the received energy. Here the radar system 10 is designed to detect objects in one hundred range cells, such range cells extending over a time duration of 100 μs, each range cell therefore corresponding to a time interval of 1 μs. The energy received by antenna 12 passes through circulator 14 to a mixer 32, via RF amplifier 35, as shown, where it is heterodyned in a conventional manner with the radio frequency signal produced by STALO 20 to produce an intermediate frequency (IF) signal. The intermediate frequency signal associated with an exemplary one of the objects (not shown) in one of the one hundred range cells is shown in FIG. 2d as an intermediate frequency chirp pulse, here 10 μs in time duration having a frequency which varies linearly from 59.5 MHz to 60.5 MHz in such time duration. That is, such pulse is essentially a replica of the transmitted pulse but delayed in time from the time such pulse was transmitted an amount related to the range of such exemplary one of the objects from the antenna 12.

The intermediate frequency chirp pulse produced at the output of mixer 32 is fed to a pulse compression section 34. The pulse compression section 34 includes a SAW delay line 36, the intermediate frequency chirp pulse being fed to such SAW delay line 36 from mixer 32 via IF amplifier 38, as shown. The SAW delay line 36 here has a compressive bandwidth of 1.0 MHz and a compressive time of 10 μs. The ratio of the compressive bandwidth to the compressive time of the SAW delay line 36 is equal in magnitude (but opposite in slope) to the dispersive bandwidth to dispersive time ratio of the SAW delay line 26. It follows, then, that SAW delay line 36 is a "down-chirp" device (frequency decreases linearly with time), that is, a compressive delay line operative over a frequency band 60.5 MHz to 59.5 MHz.

It is here noted that the intermediate frequency chirp pulse produced at the output of mixer 32 and illustrated in FIG. 2d may be represented as:

$$G(t) = e^{j2\pi[f_o t + \frac{k}{2} t^2] + \theta_i} \tag{1}$$

where:
B=chirp pulse bandwidth
T=chirp pulse width
k=B/T=chirp slope
BT=pulse compression ratio (time-bandwidth product)
1/B=compression pulse width (unweighted at 4 db points)
$f_o$=the intermediate frequency produced by the COHO 22
$\theta_i$ is an arbitrary phase angle of the target return. (In the system herein described: B=1 MHz; T=10 μs; k=0.1×10$^{12}$; B=10; 1/B=1 μs; $f_o$=60 MHz.)

The output of the pulse compression section 34, y(t), produced in response to G(t) may be represented as:

$$y(t) = G(t) \circledast h(t) \tag{2}$$

where:
$\circledast$ is the symbol for convolution; and
h(t) is the impulse response of the pulse compression section 34.

Hence, from equations (1) and (2):

$$y(t) = G(t) \circledast h(t) = \int_{-T/2}^{T/2} h(t - \lambda) G(\lambda) d\lambda \tag{3}$$

$$= \int_{-T/2}^{T/2} e^{j2\pi[f_o(t-\lambda) - \frac{k}{2}(t-\lambda)^2]} e^{j2\pi f_o \lambda + \frac{k}{2}\lambda^2 + \theta_i} d\lambda$$

$$= \left( T e^{j2\pi[f_o t - \frac{k}{2} t^2] + \theta_i} \right) \left( \frac{\sin \pi T k t}{\pi T k t} \right)$$

Converting y(t) in equation (3) to a "real" signal:

$$Re[G(t) \circledast h(t)] = \tag{4}$$

$$T\left(\frac{\sin Tkt}{Tkt}\right) \left( \cos\left[ 2\pi \left( f_o t - \frac{k}{2} t^2 \right) + \theta_i \right] \right)$$

It should be noted that the signal produced at the output of the pulse compression section 36 is a pulse compressed signal having an envelope in the form of sin x/x and has a linearly frequency modulated intermediate frequency component, i.e., −kt. That is, the pulse compression section 36 pulse compresses the intermediate frequency chirp pulse produced at the output of mixer 32 to produce a compressed pulse having a linearly frequency modulated component (or quadratic time varying phase component, −πkt$^2$). Such compressed pulse is shown in FIG. 2e. It is noted that, during the acquisition mode, the compressed pulse produced by the pulse compression section 36 is used to detect the presence of a target to establish the range of the target, such range being the time, after a pulse is transmitted, when the envelope of the compressed pulse is maximum. i.e., the time $t_1$ (FIG. 2e). The presence of such target is here detected during the acquisition phase by passing the output of SAW delay line 36 to a threshold detector 39. During any sweep, a compressed pulse having a "peak" greater than a predetermined level causes a pulse to be produced at the output of the threshold detector 39. Such pulse is fed to a counter 41 to activate such counter 41. (It is noted that counter 41 is reset at the time each pulse is transmitted, i.e., time $t_T$, by a reset signal fed to the reset terminal R of counter 41.) The output of counter 41 is fed to timing and control unit 30 for reasons to be discussed hereinafter.

The compressed pulse produced at the output of pulse compression section 36 is also fed to phase linearizer section 40 for removing the quadratic time varying phase component (i.e., $-\pi k t^2$) of the compressed pulse. Here phase linearizer section 40 includes a gate 42 fed by COHO 22 and enabled by the timing and control unit 30 to pass a 0.5 $\mu$s pulse to SAW delay line 44. As discussed above, the counter 41 provides a signal to the timing and control unit 30 representative of the time of the target return, i.e., time $t_1$. In response to such signal, the 0.5 $\mu$s pulse is fed to gate 42 by the timing and control unit 30 5.5 $\mu$s prior to the time $t_1$ during the track mode. The SAW delay line 44 produces a chirp pulse, here a "down-chirp" pulse, having a time duration of 10 $\mu$s and a bandwidth of 1.0 MHz (FIG. 2f). That is, the SAW delay line 44 produces a "down-chirp" pulse having a time duration of 10 $\mu$s and the frequency thereof varying linearly over such time duration from 60.5 MHz to 59.5 MHz. It is noted that, because the 0.5 $\mu$s pulse is applied to gate 42 at 5.5 $\mu$s prior to time $t_1$, the frequency of the "down-chirp" pulse produced by SAW delay line 44 will pass through 60 MHz (i.e., $f_o$) at the time $t_1$, i.e., at the time the envelope of the compressed pulse is maximum. The "down-chirp" pulse produced at the output of SAW delay line 44 is fed to a conventional quadrature phase detector 46, as shown. Such phase detector includes a $\pi/2$ phase shifter 48, a pair of low pass filters 51, 53, and a pair of mixers 50, 52 arranged as shown. It is noted that the pulse produced by SAW delay line 44 is produced during time radar returns are being fed to mixers 50, 52 because of the time synchronism produced by the timing and control unit 30. Hence, considering the compressed pulse shown in FIG. 2e, it is noted that the pulse produced by the SAW delay line 44 may, during the time duration of such compressed pulse, be represented as:

$$\cos 2\pi \left[ f_o(t - t_1) - \frac{k}{2}(t - t_1)^2 \right] \quad (5)$$

It should be noted that the pulse produced by SAW delay line 44 is phase synchronized with the transmitted pulse so that its phase, at any particular range cell, does not change between transmitted pulses; that is, the pulse produced by SAW delay line 44 is coherent with the transmitted pulse to enable coherent detection of the phase angle $\theta_i$ because of the common COHO 22 and STALO 20.

The effect of the phase linearizer section 40 is to remove the linearly frequency modulated, intermediate frequency component of the compressed pulse applied to such section 40. Here such section 40 also separates the compressed pulse into a pair of quadrature video compressed pulses. Rewriting equation (4) in order to place the target return at time $t_1$:

$$T\left( \frac{\sin \pi k(t - t_1)}{\pi k(t - t_1)} \right) \cos 2\pi \left[ f_o(t - t_1) - \frac{k}{2}(t - t_1)^2 + \theta_i \right] \quad (4')$$

Therefore, from equations (4') and (5), and here considering only the lower sideband frequency component produced by mixers 50, 52, the output of the "in phase" channel (i.e., output of mixer 50) may be represented as:

$$I(t) = T\left( \frac{\sin \pi Tk(t - t_1)}{\pi Tk(t - t_1)} \right) \quad (6)$$

$$\left( \cos 2\pi \left[ f_o(t - t_1) - \frac{k}{2}(t - t_1)^2 + \theta_i \right] \right)$$

$$\left( \cos 2\pi \left[ f_o(t - t_1) - \frac{k}{2}(t - t_1)^2 \right] \right)$$

$$= \frac{T}{2} \frac{\sin \pi Tk(t - t_1)}{\pi Tk(t - t_1)} \cos \theta_i$$

and likewise the signal produced in the "out-of-phase" or quadrature channel (i.e., the output of mixer 52) may be represented as:

$$Q(t) = \frac{T}{2} \frac{\sin \pi Tk(t - t_1)}{\pi Tk(t - t_1)} \sin \theta_i \quad (7)$$

It should be noted from equations (6) and (7) that the phase angle of the target return $\theta_i$ is preserved, the rate of change of such phase angle from the series of radar sweeps being proportional to the Doppler frequency of the target. By having quadrature components the "sense" of the Doppler frequency is obtained.

The quadrature compressed pulses produced at the output of phase linearizer section 40 are fed to a pair of weighting networks, here a Hamming weighting network, 54, 56 as shown. An exemplary one of such networks, here network 54, is shown in detail to include a pair of delay networks 60, 62, each having a time delay of 1/B and a summing network 64 and attenuators 66, 68 arranged in a conventional manner, as shown, to produce an output which may be represented as:

$$I(t-t_1-1/B)+0.426I(t-t_1)+0.426I(t-t_1-2/B) \quad (8)$$

Figure 3:
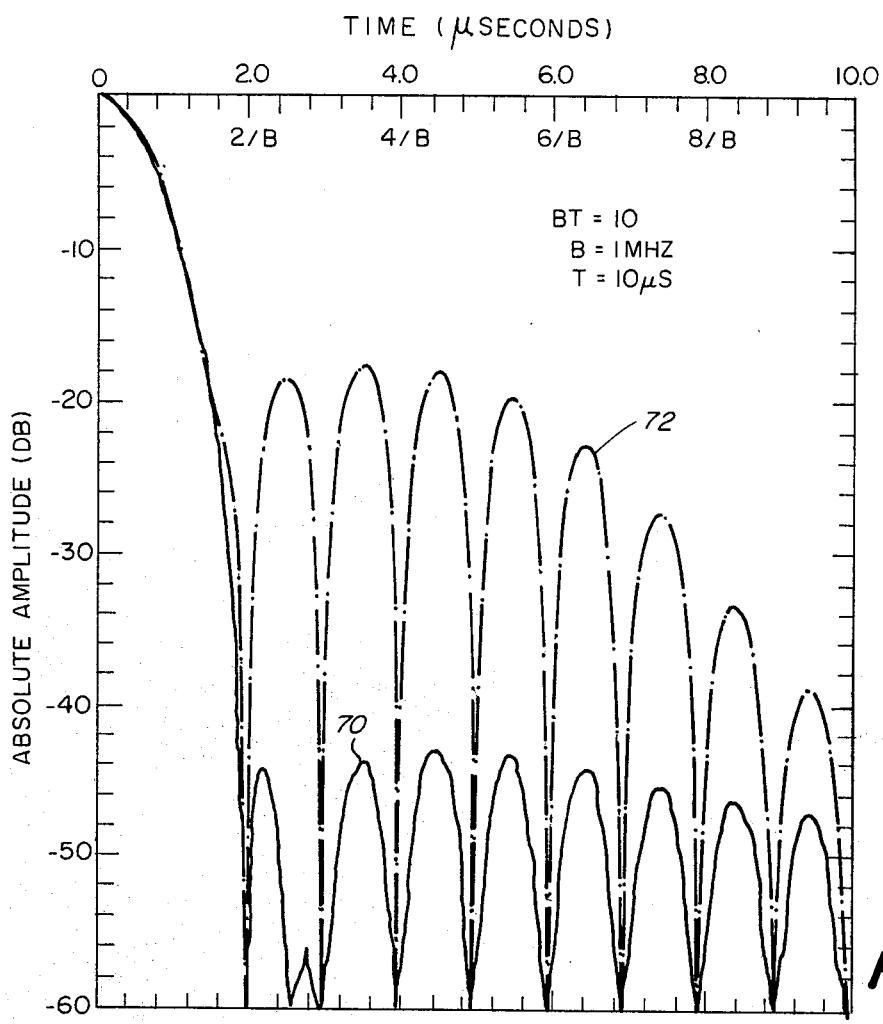
FIG. 3 is a diagram showing a comparison between sidelobes of compressed pulses, one of such pulses being produced by the radar system of FIG. 1 and the other one of such pulses being produced in a conventional radar system.

The absolute amplitude of the signal at the output of Hamming weighting network 54, for $\theta_i=0$, is shown in FIG. 3 by the curve labeled 70.

It should be noted that, if the quadratic time varying phase component of the compressed pulse produced at the output of IF pulse compression section 34 (FIG. 1) had not been removed by the chirp pulse produced by the SAW delay line 44, but rather the COHO 22 had been coupled directly to the quadrature phase detector 46, the in phase and quadrature signals which would have been fed to Hamming weighting network 54 would have been represented as:

$$I'(t) = \frac{T}{2}\left(\frac{\sin \pi Tk(t-t_1)}{\pi Tk(t-t_1)}\right)(\cos[-\pi k(t-t_1)^2 + \theta_i]) \quad (9)$$

$$Q'(t) = \frac{T}{2}\left(\frac{\sin \pi Tk(t-t_1)}{\pi Tk(t-t_1)}\right)(\sin[-\pi k(t-t_1)^2 + \theta_i]) \quad (10)$$

Figure 4A:
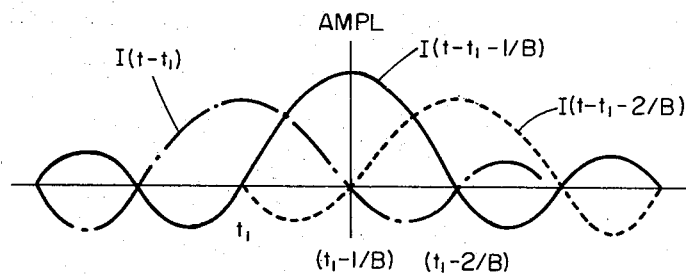
FIGS. 4a-4b are diagrams useful in understanding the invention.
Figure 4B:
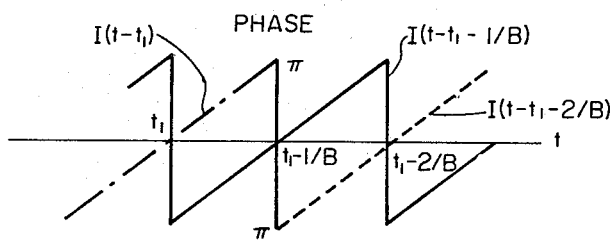

It should be noted that, in the case where the quadratic time varying phase component of the compressed pulse has been removed, each of the pulses applied to summing network 64 has a $\pi$ radian phase shift one relative to the others, whereas in the case where the quadratic time varying phase component of the compressed pulse is not removed, such $\pi$ radian phase shift no longer exists, thereby reducing the effect of the Hamming weighting network. For example, FIG. 4a shows the amplitude of the three compressed pulses fed to summing network 64 when the quadratic time varying phase component of the compressed pulse has been removed. FIG. 4b shows the phase of each of the three compressed pulses after the quadratic time varying phase component has been removed.

Considering equation (9), it is noted that I'(t) is made up of the product of two functions:

$$\frac{\sin \pi Tk(t-t_1)}{\pi Tk(t-t_1)} \text{ and } \cos[-\pi k(t-t_1)^2 + \theta_i].$$

Therefore, I'(t) may be rewritten as:

$$I'(t) = \frac{T}{2}\left(\frac{\sin[\pi Tk(t-t_1) - \pi k(t-t_1)^2 + \theta_i]}{\pi kT(t-t_1)} + \frac{\sin[\pi Tk(t-t_1) + \pi k(t-t_1)^2 - \theta_i]}{\pi Tk(t-t_1)}\right) \quad (11)$$

Therefore, from equation (11) it is noted that I'(t) differs from I(t) because of the term $\pi k(t-t_1)^2$, and such term may be considered as a phase error $e_p$. It is noted that $$e_p = \pi k(t-t_1)^2 = \frac{\pi B^2}{BT}(t-t_1)^2.$$

Therefore at a given sidelobe, say the second sidelobe, $t-t_1=2.5/B$ and the $e_p=\pi(6.25)/BT$. Therefore, $e_p$ is inversely proportional to BT, the time-bandwidth product. Therefore, while the phase error $e_p$ may be negligible for high time-bandwidth products, at low time-bandwidth products such error is significant, thereby drastically reducing the effectiveness of the Hamming weighting. The output of Hamming weighting network 54, for $\theta_i=0$, for pulses having quadratic time varying phase is shown in FIG. 3 by the curve labeled 72 for a time-bandwidth product of 10.

Completing the radar system 10 shown in FIG. 1, the signals produced by the Hamming weighting networks 54, 56 are fed to utilization device 80, here a conventional MTI canceller network and cathode ray display.

Figure 5:
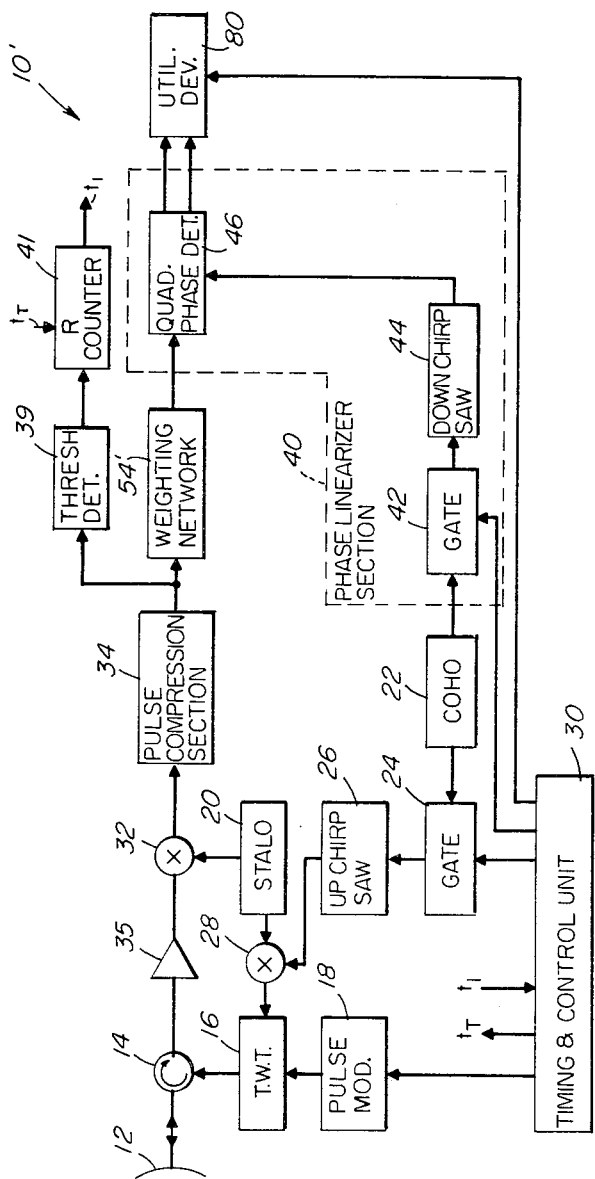
FIG. 5 is a block diagram of an alternative embodiment of a radar system according to the invention.

Referring now to FIG. 5, an alternative embodiment of the invention is shown. Here the weighting network 54' is disposed in the intermediate frequency (IF) section of the radar system 10' rather than after the phase linearizer section 40 as in FIG. 1.

Figure 6:
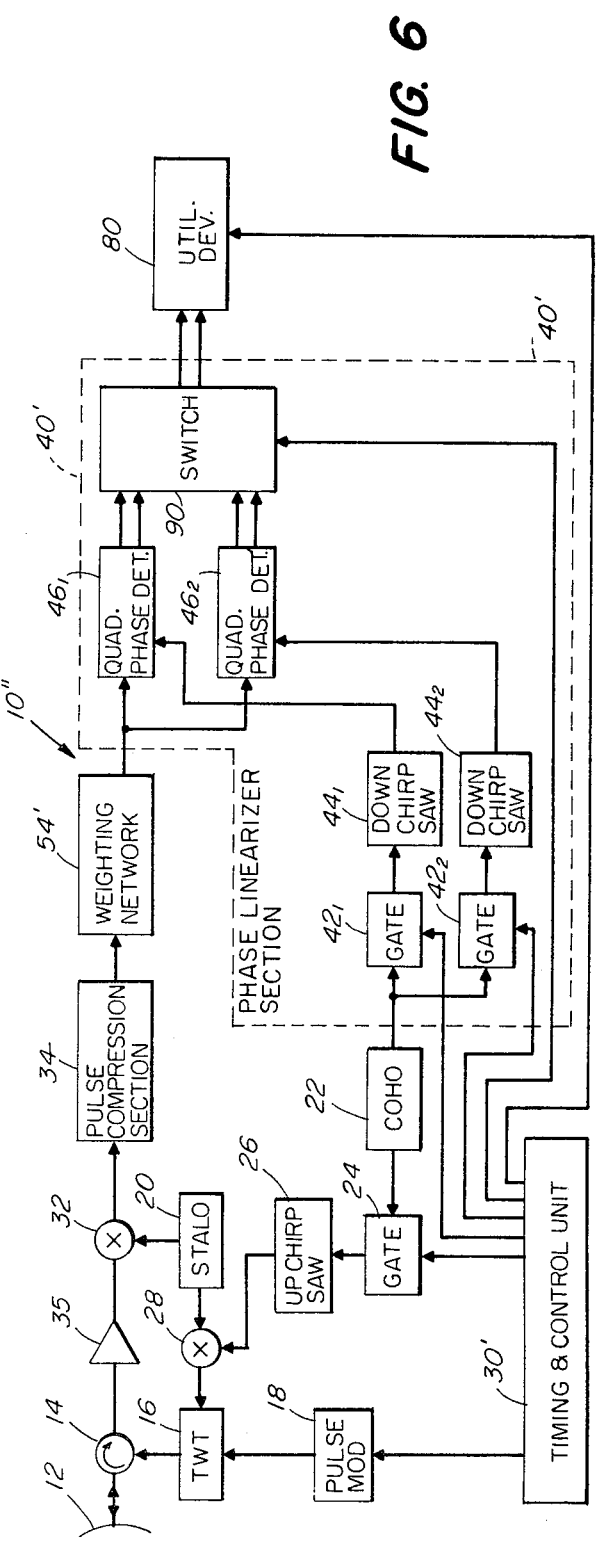
FIG. 6 is a block diagram of an alternative embodiment of a radar system according to the invention.
Figure 7A:
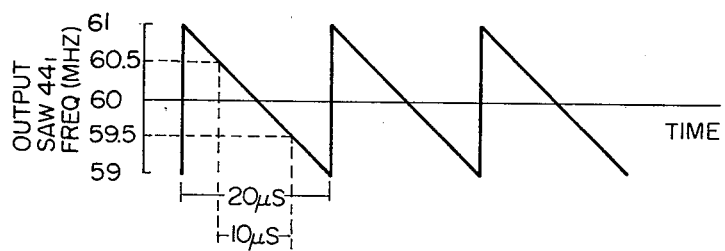
FIGS. 7a-7c are timing diagrams useful in understanding the operation of the radar system of FIG. 6.
Figure 7B:
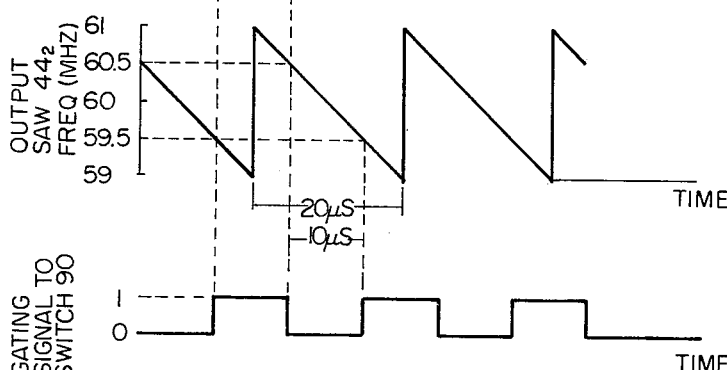
Figure 7C:
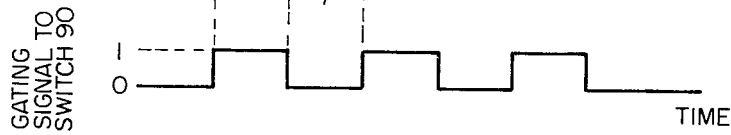

Referring now to FIG. 6, a second alternative embodiment of the invention is shown. Here radar system 10'' is adapted to remove the quadratic time varying phase component of the compressed pulse produced by the pulse compression section 34 during both the search and track modes. Here phase linearizer section 40' includes a pair of gates $42_1$, $42_2$ coupled to a corresponding pair of SAW delay lines $44_1$, $44_2$, each, in turn, feeding a different one of a pair of quadrature phase detectors $46_1$, $46_2$, as shown. Each one of the SAW delay lines $44_1$, $44_2$ produces a "down-chirp" pulse having a time duration of 20 $\mu$s and produces a 2 MHz frequency variation in such time duration, here from 61 MHz to 59 MHz, in response to gating signals supplied to the one of the gates $42_1$, $42_2$ coupled thereto from timing and control unit 30'. The gating pulses supplied to each one of the gates $42_1$, $42_2$ have a pulse repetition interval of 20 $\mu$s, and gate $42_1$ is pulsed 10 $\mu$s after gate $42_2$ is pulsed. Therefore, the signals produced by SAW delay lines $44_1$, $44_2$ are as shown in FIGS. 7a, 7b, respectively. In this way, the peak of the envelope of the compressed pulse fed to the phase linearizer section 40' will be aligned with, or approximately aligned with, the center frequency of the signal produced by either SAW delay $44_1$ or SAW delay line $44_2$. It is noted that, if such alignment is not exact, a beat frequency component will be produced at the output of the quadrature phase detectors, such beat frequency being related to the degree of misalignment. The pair of outputs of the pair of quadrature phase detectors $46_1$, $46_2$ are fed to a switch 90. Also fed to switch 90 is a binary gating signal produced by timing and control unit 30'. The binary gating signal is shown in FIG. 7c. When such signal is "high" (i.e., logical 1), the output of quadrature phase detector $46_1$ is fed to utilization device 80, and when such signal is "low" (i.e., logical 0), the output of quadrature phase detector $46_2$ is fed to such utilization device 80. It is noted that such signal is a logical 1 during the center 10 $\mu$s period of the 20 $\mu$s chirp pulse produced by SAW delay line $44_1$, and such signal is a logical 0 during the center 10 $\mu$s period of the 20 $\mu$s chirp pulse produced by SAW delay line $44_2$.

Figure 8:
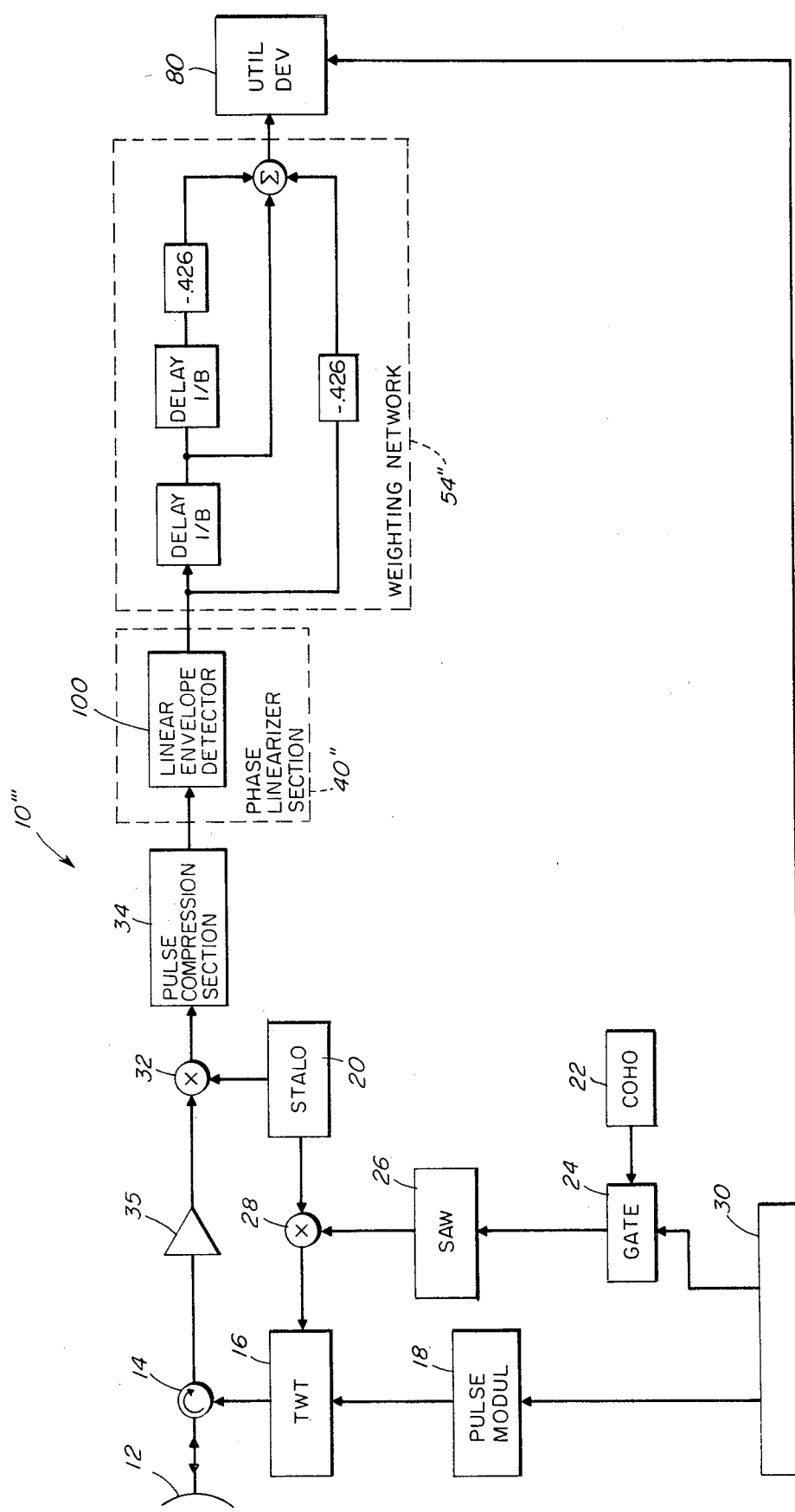
FIG. 8 is a block diagram of an alternative embodiment of a radar system according to the invention.

Referring now to FIG. 8, a radar system 10''' is shown here using a linear envelope detector 100 for providing the absolute value of the compressed pulse fed thereto by the pulse compression section 34. Such envelope detector 100 provides the phase linearizer section 40'' for the radar system by removing the quadratic time varying phase component $(-\pi kt^2)$ of the compressed pulse. The signal produced at the output of the phase linearizer section is fed to weighting network 54''. It is noted that the weighting network 54'' here is different from the Hamming weighting network 54 because factors $-0.426$ are used in place of $+0.426$. The output of such network 54'' may therefore be represented as:

$$A(t-1/B) - 0.426A(t) - 0.426A(t-2/B)$$

where $$A(t) \text{ is } \left| T \frac{\sin(\pi Tkt)}{(\pi Tkt)} \right|.$$

Figure 9:
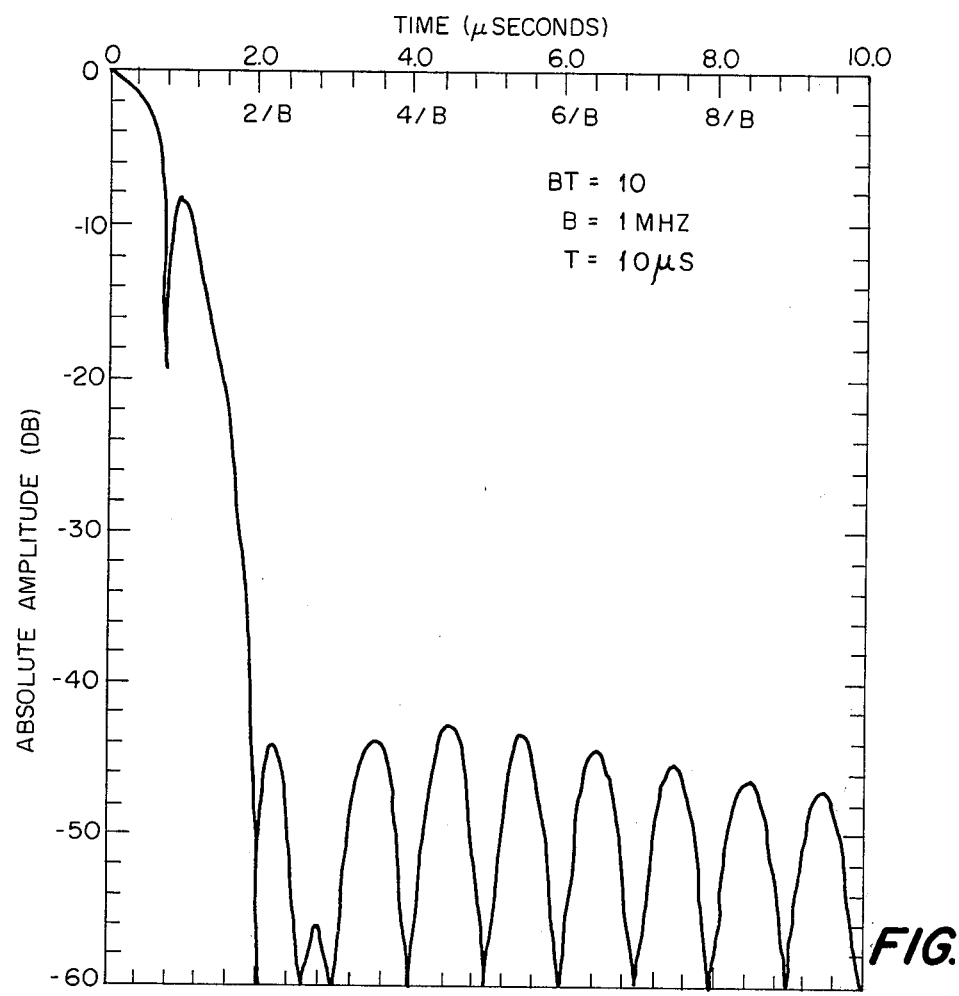
FIG. 9 is a diagram showing a compressed pulse produced by the radar system of FIG. 8.

FIG. 9 shows the output of the weighting network 54''. The output of the weighting network 54'' is fed to a utilization device 80. It is here noted that phase information of the return has been eliminated; however, such arrangement is useful in non-coherent MTI radar systems. Further, such linear envelope detector 100 and weighting network 54" may be used in frequency spectrum analysis, such as described in U.S. Pat. No. 4,005,417 referred to above, to reduce sidelobes of the pulse compressed signal prior to being fed to a utilization device.

Figure 10:
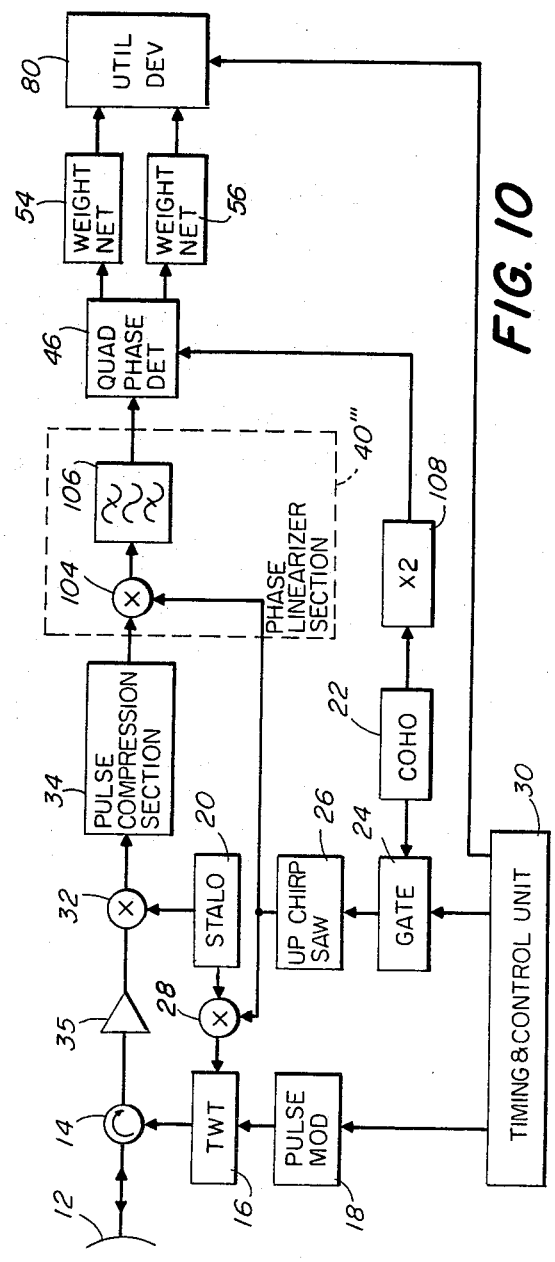
FIG. 10 is a block diagram of an alternative embodiment of the invention.

Referring now to FIG. 10, a radar system, here in the track mode, is shown wherein the up chirp SAW delay line 26 is fed to the phase linearizer section 40'''. The output of pulse compression section 34 may be represented as:

$$T\left(\frac{\sin \pi Tk(t - t_1)}{\pi Tk(t - t_1)}\right) \quad (12)$$

$$\left(\cos 2\pi \left[f_o(t - t_1) - \frac{k}{2}(t - t_1)^2\right] + \theta_i\right)$$

Here the SAW delay line 26 is pulsed at time $t_1 - 5.5$ μs, in addition to the transmit time, time $t_1$ being the time of the target return as discussed in connection with FIG. 1. The output of up chirp SAW delay line 26 in response to the pulse at time $t_1 - 5.5$ μs may be represented as:

$$\cos 2\pi \left(f_o t + \frac{k}{2} t^2\right) \quad (13)$$

The signals are heterodyned in mixer 104 and, here, the upper sideband is passed through a bandpass filter 106, here having a center $2f_o$. The output of filter 106 may be represented as:

$$\frac{T}{2}\left(\frac{\sin \pi Tk(t - t_1)}{\pi Tk(t - t_1)}\right)(\cos 2\pi[2f_o(t - t_1) + \theta_i]) \quad (14)$$

It is noted that the quadratic time varying phase component $\pi kt^2$ has been removed. The output of bandpass filter 106 is fed to quadrature phase detector 46 along with a signal from the COHO 22 after such signal passes through a x2 frequency multiplier 108 to produce a signal having a frequency $2f_o$. The quadrature phase detector produces at its output the signals I(t) and Q(t) as in equations (6) and (7).

Figure 11:
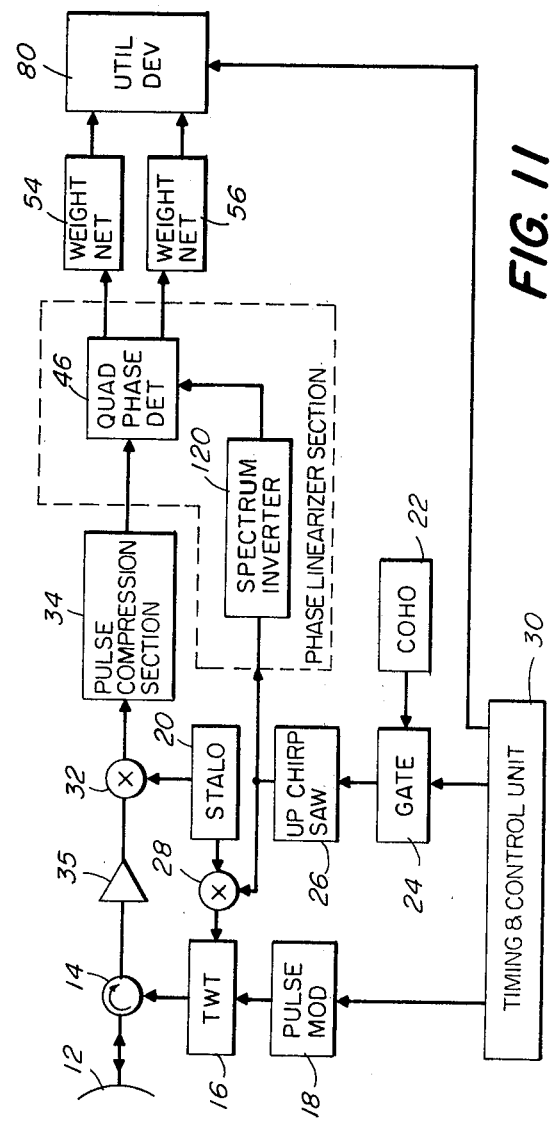
FIG. 11 is a block diagram of an alternative embodiment of the invention.

Referring now to FIG. 11, in this embodiment the output of SAW 26 is fed to a spectrum inverter 120 which converts the up chirp pulses produced by such SAW delay line 26 to down-chirp pulses equivalent to those produced by SAW delay line 44 (FIG. 1), thereby eliminating one SAW delay line, in particular SAW delay line 44 (FIG. 1).

Having described preferred embodiments of the invention, other variations and modifications will now be apparent to one of skill in the art. For example, the SAW delay line 26 may be replaced with a sweep oscillator phase coherent with the PRI of the radar system to provide a coherent radar system. Further, where an up chirp pulse is shown as the transmitted pulse, a down-chirp pulse may be used with proper modification of the pulse compression section SAW delay line 36 and appropriate modification of the various phase linearizer sections described herein. That is, with the system shown in FIG. 1, if SAW delay line 26 produces a down-chirp pulse, SAW delay lines 36, 44 must produce up chirp pulses. It is felt, therefore, that this invention should not be restricted to the preferred embodiments, but rather should be limited only by the spirit and scope of the appended claims.

What is claimed is:

1. A signal processor, comprising:
   (a) means for pulse compressing an intermediate frequency chirp pulse to produce a compressed pulse having a linearly frequency modulated, intermediate frequency component; and
   (b) means for removing the linearly frequency modulated, intermediate frequency component of such compressed pulse, such removing means including a quadrature phase detector means for separating the compressed pulse into a pair of quadrature video compressed pulses.

2. The signal processor recited in claim 1 including a weighting network for reducing sidelobes of the pair of quadrature video compressed pulses.

3. The signal processor recited in claim 1 including means for producing the intermediate frequency chirp pulse, such pulse being fed to the quadrature phase detector means.

4. A signal processor, comprising:
   (a) means for producing a chirp pulse;
   (b) means for pulse compressing an intermediate frequency chirp pulse to produce a compressed pulse having a linearly frequency modulated, intermediate frequency component;
   (c) means for removing the linearly frequency modulated, intermediate frequency component of such compressed pulse, such removal means including heterodyning means fed by the compressed pulse and the chirp pulse.

5. The signal processor recited in claim 4 wherein the removal means includes a bandpass filter for passing the portion of the signal produced at the output of the heterodyning means having a frequency $2f_o$, where $f_o$ is the intermediate frequency, and a quadrature phase detector means fed by the bandpass filter and a signal having a frequency $2f_o$.

6. A signal processor, comprising:
   (a) means for pulse compressing an intermediate frequency chirp pulse to produce a compressed pulse having a linearly frequency modulated, intermediate frequency component;
   (b) means for removing the linearly frequency modulated, intermediate frequency component of such compressed pulse, such removing means including a linear envelope detector for producing a signal having the absolute value of the compressed pulse; and
   (c) a weighting network for reducing sidelobes of the signal produced at the output of the removing means.

7. A signal processor, comprising:
   (a) means for producing a first chirp pulse having a phase angle component $2\pi f_o t \pm k/2 t^2$, where t is time; $f_o$ is an intermediate frequency; and k is the frequency slope of the chirp pulse;
   (b) means for pulse compressing the first chirp pulse to produce a compressed pulse having a phase angle component $2\pi f_o t \pm (k/2) t^2$;
   (c) means for producing a second chirp pulse having a phase angle component, $2\pi f_o t \pm (k/2) t^2$; and
   (d) means for heterodyning the compressed pulse with the second chirp pulse.

8. A signal processor, comprising:

(a) means for producing a first chirp pulse having a phase angle component $2\pi f_o \pm (k/2)t^2$ where: t is time, $f_o$ is an intermediate frequency, and k is the frequency slope of the chirp pulse;

(b) means for pulse compressing the first chirp pulse to produce a compressed pulse having a phase angle component $2\pi f_o \pm (k/2)t^2$; and (c) heterodyning means fed by the first chirp pulse and the compressed pulse for producing a signal having a phase angle component $2\pi(2f_o t)$; and (d) phase detector means for detecting the phase angle of the signal produced by the heterodyning means.

9. A signal processor, comprising:

(a) means for producing a chirp pulse having a phase angle component $2\pi f_o t \pm (k/2)t^2$ where: t is time, k is the chirp slope, and $f_o$ is an intermediate frequency;

(b) means for producing a second chirp pulse having a phase angle component $2\pi f_o t \pm (k/2)t^2$;

(c) means for pulse compressing the chirp pulse to produce a compressed pulse having a phase angle component $2\pi f_o t \pm (k/2)t^2$; and (d) means for removing the phase angle component $2\pi f_o t \pm (k/2)t^2$ from the compressed pulse, the removing means including a quadrature phase detector responsive to the compressed pulse and the second chirp pulse.

10. The signal processor recited in claim 9 wherein the removing means includes a heterodyning means fed by the compressed pulse and the chirp pulse producing means.

11. In a chirp pulse compression radar system wherein a pulse compression section is provided to pulse compress a received chirp pulse having an intermediate frequency, the improvement wherein:

means are provided for mixing the compressed pulse with a second chirp pulse having a frequency modulation rate opposite in sense to that of the received chirp pulse.

12. The improvement recited in claim 11 wherein the mixing means includes a quadrature phase detector and including means for enabling the phase of the received chirp pulse to be phase coherent with the phase of the second chirp pulse.

* * * * *

UNITED STATES PATENT OFFICE
CERTIFICATE OF CORRECTION

Patent No. 4,333,080      Dated June 1, 1982

Inventor(s) John D. Collins, Douglas S. MacFall, Jr. and William A. Sciarretta

It is certified that error appears in the above-identified patent and that said Letters Patent are hereby corrected as shown below:

Equation 1, delete "$G(t) = e^{j2\pi}[fot + \frac{k}{2}t2] + \theta_1$"

and replace with --$G(t) = e^{j2\pi}[f_o t + \frac{k}{2}t^2] + \theta_1$--;

Column 4, line 27, delete "B=10" and replace with --BT=10--.

Signed and Sealed this

Ninth Day of November 1982

[SEAL]

*Attest:*

*Attesting Officer*

GERALD J. MOSSINGHOFF

*Commissioner of Patents and Trademarks*